United States Patent
Ahmad et al.

(10) Patent No.: US 10,302,741 B2
(45) Date of Patent: May 28, 2019

(54) METHOD AND APPARATUS FOR LIVE-OBJECT DETECTION

(71) Applicant: Texas Instruments Incorporated, Dallas, TX (US)

(72) Inventors: Adeel Ahmad, Plano, TX (US); Dan Wang, Dallas, TX (US); Muhammad Zubair Ikram, Richardson, TX (US); Murtaza Ali, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 300 days.

(21) Appl. No.: 15/089,956

(22) Filed: Apr. 4, 2016

(65) Prior Publication Data

US 2016/0291142 A1 Oct. 6, 2016

Related U.S. Application Data

(60) Provisional application No. 62/142,086, filed on Apr. 2, 2015.

(51) Int. Cl.
*G01S 7/35* (2006.01)
*G01S 7/41* (2006.01)
*G01S 13/93* (2006.01)

(52) U.S. Cl.
CPC .............. *G01S 7/352* (2013.01); *G01S 7/414* (2013.01); *G01S 7/415* (2013.01); *G01S 13/931* (2013.01); *G01S 2007/356* (2013.01)

(58) Field of Classification Search
CPC .......... G01S 7/352; G01S 7/414; G01S 7/415; G01S 13/931; G01S 2007/356; G01S 13/888; G01S 13/9023; G01S 13/95; G01S 7/2923; G01S 13/867; G01S 7/295; G01S 15/582; G01S 15/101; G01S 13/581;
(Continued)

(56) References Cited

U.S. PATENT DOCUMENTS 4,339,754 A * 7/1982 Hammers ............... G01S 13/52
342/16
4,990,925 A * 2/1991 Edelsohn ............ G01K 11/006
342/190
(Continued)

FOREIGN PATENT DOCUMENTS

JP      2004289762 A  *  10/2004  .............. G10L 11/00

OTHER PUBLICATIONS

S. Chang, M. Wolf, and J. W. Burdick, "Human detection and tracking via Ultra-Wideband (UWB) radar," in Robotics and Automation (ICRA), 2010 IEEE International Conference on, 2010, pp. 452-457.
(Continued)

*Primary Examiner* — Bernarr E Gregory
*Assistant Examiner* — Nuzhat Pervin
(74) *Attorney, Agent, or Firm* — Kenneth Liu; Charles A. Brill; Frank D. Cimino

(57) ABSTRACT

An FMCW radar is used to detect live objects by processing the matched, filtered radar return on a frame by frame basis. An FFT cross correlation coefficient is computed, followed by computing a modified geometric mean of the absolute value of the cross correlation coefficients. The modified geometric mean is then compared to a preset threshold to determine whether the object is moving or is stationary.

12 Claims, 2 Drawing Sheets

(58) Field of Classification Search
CPC ...... G01S 3/8006; G01S 7/4021; G01S 7/412; G01S 7/285; G01S 7/52017; G01V 1/34; G01V 1/005; A61B 5/0205; A61B 5/015; A61B 3/102; G06K 9/00798; G05F 8/10; G06T 7/50; G01K 11/006; H04B 1/1018; H04W 24/06; G10L 25/90
USPC .......................................................... 342/28
See application file for complete search history.

(56) References Cited

U.S. PATENT DOCUMENTS

| | | | | |
|---|---|---|---|---|
| 5,659,318 | A * | 8/1997 | Madsen | G01S 13/9023 342/156 |
| 6,448,923 | B1 * | 9/2002 | Zrnic | G01S 13/581 342/26 R |
| 6,789,054 | B1 * | 9/2004 | Makhlouf | G06F 8/10 703/22 |
| 7,929,375 | B2 * | 4/2011 | Nuttall | G01S 15/582 367/100 |
| 9,229,102 | B1 * | 1/2016 | Wright | G01S 13/888 |
| 9,494,682 | B2 * | 11/2016 | Choi | G01S 7/285 |
| 9,536,143 | B2 * | 1/2017 | Jiang | G06T 7/50 |
| 2002/0044083 | A1 * | 4/2002 | Meyer-Hilberg | G01S 7/295 342/175 |
| 2003/0103212 | A1 * | 6/2003 | Westphal | A61B 3/102 356/479 |
| 2004/0127791 | A1 * | 7/2004 | Mast | A61B 5/015 600/438 |
| 2007/0106157 | A1 * | 5/2007 | Kaczkowski | A61B 5/015 600/438 |
| 2008/0106460 | A1 * | 5/2008 | Kurtz | G01S 7/352 342/99 |
| 2009/0003134 | A1 * | 1/2009 | Nuttall | G01S 15/101 367/87 |
| 2009/0010103 | A1 * | 1/2009 | Sallas | G01V 1/005 367/41 |
| 2009/0278728 | A1 * | 11/2009 | Morgan | A61B 5/0205 342/115 |
| 2009/0292475 | A1 * | 11/2009 | Alam | G01V 1/34 702/14 |
| 2010/0265799 | A1 * | 10/2010 | Cevher | G01S 3/8006 367/121 |
| 2010/0286981 | A1 * | 11/2010 | Krini | G10L 25/90 704/206 |
| 2011/0025546 | A1 * | 2/2011 | Cook | G01S 7/2923 342/22 |
| 2011/0295548 | A1 * | 12/2011 | Takabayashi | G06K 9/00798 702/142 |
| 2012/0143510 | A1 * | 6/2012 | Alam | G01V 1/34 702/16 |
| 2013/0335569 | A1 * | 12/2013 | Einecke | G01S 13/867 348/148 |
| 2014/0022113 | A1 * | 1/2014 | Nogueira-Nine | G01S 7/412 342/128 |
| 2014/0333475 | A1 * | 11/2014 | Sierwald | G01S 13/95 342/26 R |
| 2015/0234040 | A1 * | 8/2015 | Nikolov | G01S 7/52017 367/7 |
| 2015/0235081 | A1 * | 8/2015 | Jiang | G06K 9/00476 382/109 |
| 2016/0020792 | A1 * | 1/2016 | Wilson | H04B 1/1018 375/227 |
| 2017/0199270 | A1 * | 7/2017 | Huemer | G01S 7/038 |
| 2017/0325101 | A1 * | 11/2017 | Gates | H04W 24/06 |

OTHER PUBLICATIONS

E. Yavari, C. Song, V. Lubecke, and O. Boric-Lubecke, "System-on-Chip based Doppler radar occupancy sensor," in 2011 Annual International Conference of the IEEE Engineering in Medicine and Biology Society, 2011, pp. 1913-1916.

C. Kun-Mu, H. Yong, Z. Jianping, and A. Norman, "Microwave life-detection systems for searching human subjects under earthquake rubble or behind barrier," Biomedical Engineering, IEEE Transactions on, vol. 47, pp. 105-114, 2000.

* cited by examiner

METHOD AND APPARATUS FOR LIVE-OBJECT DETECTION

CLAIM OF PRIORITY

This application claims priority under 35 U.S.C. 119(e)(1) to U.S. Provisional Application No. 62/142,086 filed Apr. 2, 2015.

TECHNICAL FIELD OF THE INVENTION

The technical field of this invention is radar based live object detection.

BACKGROUND OF THE INVENTION

Recent years have witnessed widespread use of millimeter wave (mm-Wave) radars for advanced driver assistance system (ADAS) applications. Compared with other sensing modalities such as a camera, radar has the ability to perform equally well during different times of the day and can be deployed out of sight behind the car bumper or the doors. In many ADAS applications such as parking, cruise control, and braking, the radar is primarily used to find the three-dimensional location of objects around the vehicle. This includes range, azimuth angle, and elevation angle. The range is computed from the round trip delay of the transmitted signal and the two-dimensional (2D) angle is estimated by using the data collected by an antenna array employing a beamforming-based or an eigen-decomposition based high-resolution frequency estimation method.

The use of radar sensors in automotive pedestrian recognition systems is of special interest since radar sensors are less influenced by environmental conditions (e.g. fog, rain, etc.) as other systems like video cameras. Moreover, high resolution radar sensors are available in many modern vehicles as a part of Adaptive Cruise Control (ACC) systems.

SUMMARY OF THE INVENTION

A 77 GHz radar is used to detect a moving object in its view. This invention is based on processing the matched-filtered radar return on a frame-by-frame basis. For each window, the zeroth lag FFT cross-correlation coefficient is computed of the first chirp in the first frame with the first chirp in subsequent frames. Modified geometric mean (MGM) of the absolute values of these cross-correlation coefficients is then computed and compared with a threshold. This MGM serves as a decision measure to distinguish between a static scene and a scene that has a living object present in it.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
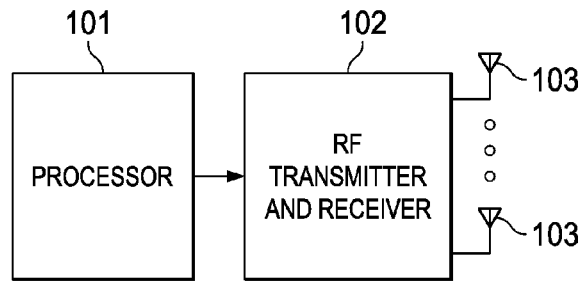
FIG. 1 is a block diagram of the radar employed in the invention.
Figure 2:
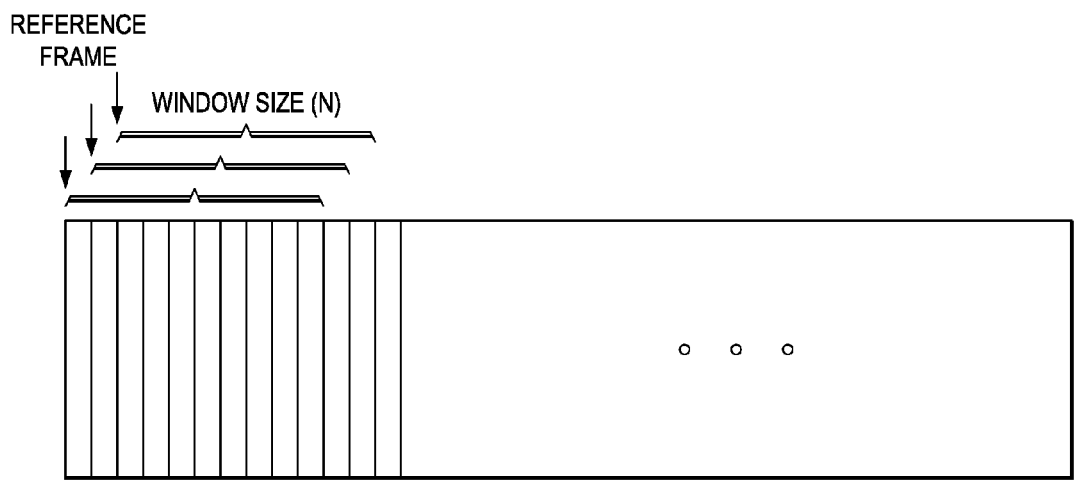
FIG. 2 shows the received radar frames.

As shown in FIG. 1, a radar based pedestrian recognition system may consist of an RF transmitter and receiver (102), a transmit/receive antenna (103) and a signal processing unit (101). The implementation shown employs a 77 GHz FMCW (frequency modulated continuous wave) radar. FIG. 2 shows the received radar frames after they are matched-filtered with the transmitted chirps. Each frame contains multiple FMCW chirps, where the matched filtered chirps are called the beat signal x(n). For a frame, only the first chirp will be considered in the processing shown in this invention.

Figure 3:
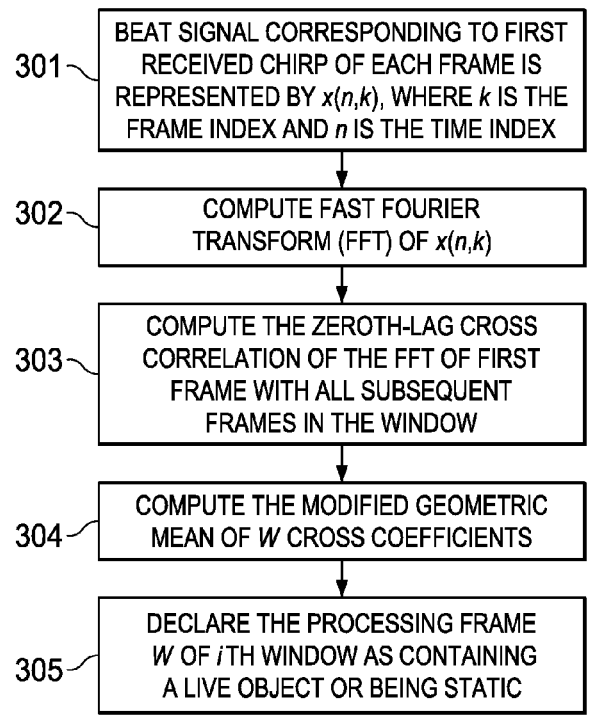
FIG. 3 is a block diagram of the method of this invention.

The live object detection method of this invention is shown in FIG. 3.

(301) The beat signal corresponding to the first received chirp of each frame is represented by x(n,k), where k is the frame index and n is the time index.

(302) Compute fast Fourier transform (FFT) of x(n,k). Call it X(f,k), a column vector of size K, where K is FFT size.

(303) For the ith window of size W frames chosen by the user, compute the zeroth-lag cross correlation of the FFT of first frame with all subsequent frames in the window. Call this cross-correlation $C_0(i,k)$. It is computed as:

$$C_0(i,k) = \frac{1}{|X^H(f,0)X(f,0)||X^H(f,k)X(f,k)|} X^H(f,0) X(f,k),$$
$$k = 0, \ldots, W-1.$$

(304) Compute the modified geometric mean of W cross coefficients as:

$$G(i) = \prod_{k=0}^{W} |C_0(i,k)|.$$

(305) Declare the processing frame W of ith window as containing a live object or being static based on the following criterion:

If $G(i) \geq \gamma$, the scene is declared static

If $G(i) < \gamma$, the scene is declared to have a live object present in it.

The threshold γ ranges between 0 and 1 and is chosen by the user beforehand.

Figure 4:
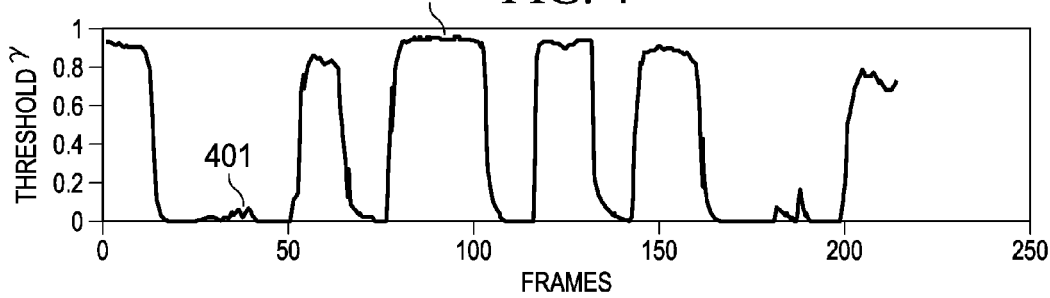
FIG. 4 is a plot of experimental results.

FIG. 4 shows a plot of γ with values between 0 and one, plotted against 200 frames, showing live objects 401 and static objects 402.

What is claimed is:

1. A method of moving object detection using a radar system comprising:

generating, by a processor of the radar system, a frequency modulated continuous wave (FMCW) signal;

transmitting the FMCW signal toward an object to be detected using an antenna;

receiving, by the antenna, a signal, the received signal including a reflection from the object of the transmitted FMCW signal;

executing instructions using the processor to perform the steps of:

forming a plurality of sequentially-ordered frames based on the received signal, wherein each frame includes a plurality of sequential chirps, wherein each sequential chirp within a frame is determined by filtering a chirp in the received signal with a corresponding chirp in the transmitted FMCW signal;

defining a plurality of windows, each window including at least a subset of the sequentially-ordered frames, the subset being contiguous and including a first frame that is the sequentially earlier than all other frames of the subset;

for each frame:
  identifying, from the sequential chirps of the frame, an earliest-received chirp as a first chirp; and
  computing a fast Fourier transform (FFT) of the first chirp; and for each window:
  computing a zeroth lag cross correlation of the FFT of the first chirp of the first frame in the window with the FFT of the first chirp of each other frame in the window to obtain W zeroth lag cross correlation coefficients, wherein W is the number of frames in the window;
  computing a geometric mean using the W zeroth lag cross correlation coefficients;
  comparing the geometric mean to a predetermined threshold; and
  using a result of comparing the geometric mean to the predetermined threshold to determine whether the object is static or moving in the window.

2. The method of claim 1, wherein:
for each frame:
  the first chirp of the frame is represented by x(n,k) where k is the frame index and n is the time index within the frame;
  the FFT of the first chirp is represented by X(f,k); and
  the computation of the zeroth lag cross correlation of the FFT of the first chirp with the FFT of the first chirp of each other frame in the window to obtain W zeroth lag cross correlation coefficients is determined as:

$$C_0(i,k) = \frac{1}{|X^H(f,0)X(f,0)\|X^H(f,k)X(f,k)|} X^H(f,0)X(f,k),$$

$$k = 0, \ldots, W-1.$$

3. The method of claim 2, wherein the geometric mean is determined as:

$$G(i) = \prod_{k=0}^{W} |C_0(i,k)|.$$

4. The method of claim 1, wherein, for each frame, the first chirp is the only chirp in the frame on which a fast Fourier transform is applied.

5. The method of claim 1, wherein the transmitted FMCW signal is a 77 GHz FMCW signal.

6. The method of claim 1, wherein the number of frames W for each window is equal.

7. An electronic system comprising:
  a radio frequency transmitter to generate a frequency modulated continuous wave (FMCW) signal;
  an antenna to transmit the FMCW signal toward an object located at a distance from the electronic system and to a receive a signal from the object, the received signal including a reflection from the object of the transmitted FMCW signal;
  a processor; and
  memory to store program instructions that, when executed by the processor, cause the electronic system to:
    form a plurality of sequentially-ordered frames based on the received signal, wherein each frame includes a plurality of sequential chirps, wherein each sequential chirp within a frame is determined by filtering a chirp the received signal with a corresponding chirp in the transmitted FMCW signal;
    define a plurality of windows, each window including at least a subset of the sequentially-ordered frames, the subset being contiguous and including a first frame that is the sequentially earlier than all other frames of the subset;
    for each frame:
      identify, from the sequential chirps of the frame, an earliest-received chirp as a first chirp; and
      compute a fast Fourier transform (FFT) of the first chirp; and
    for each window:
      compute a zeroth lag cross correlation of the FFT of the first chirp of the first frame in the window with the FFT of the first chirp of each other frame in the window to obtain W zeroth lag cross correlation coefficients, wherein W is the number of frames in the window;
      compute a geometric mean using the W zeroth lag cross correlation coefficients;
      compare the geometric mean to a predetermined threshold; and
      use a result of comparing the geometric mean to the predetermined threshold to determine whether the object is static or moving in the window.

8. The electronic system of claim 7, wherein:
for each frame:
  the first chirp of the frame is represented by x(n,k) where k is the frame index and n is the time index within the frame;
  the FFT of the first chirp is represented by X(f,k); and
  the computation of the zeroth lag cross correlation of the FFT of the first chirp with the FFT of the first chirp of each other frame in the window to obtain W zeroth lag cross correlation coefficients is determined as:

$$C_0(i,k) = \frac{1}{|X^H(f,0)X(f,0)\|X^H(f,k)X(f,k)|} X^H(f,0)X(f,k),$$

$$k = 0, \ldots, W-1.$$

9. The electronic system of claim 8, wherein the geometric mean is determined as:

$$G(i) = \prod_{k=0}^{W} |C_0(i,k)|$$

10. The electronic system of claim 7, wherein, for each frame, the first chirp is the only chirp in the frame on which a fast Fourier transform is applied.

11. The electronic system of claim 7, wherein the transmitted FMCW signal is a 77 GHz FMCW signal.

12. The electronic system of claim 7, wherein the number of frames W for each window is equal.

* * * * *